United States Patent
Liu et al.

(10) Patent No.: US 12,476,507 B2
(45) Date of Patent: Nov. 18, 2025

(54) CONDUCTIVE COMPOSITE STATOR UNIT FOR AN ELECTRIC MOTOR OF A VEHICLE

(71) Applicant: GM Global Technology Operations LLC, Detroit, MI (US)

(72) Inventors: Yi Liu, Troy, MI (US); Qigui Wang, Rochester Hills, MI (US); Huaxin Li, Rochester Hills, MI (US); Kestutis A. Sonta, Warren, MI (US); Daniel J. Wilson, Linden, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 336 days.

(21) Appl. No.: 18/337,192

(22) Filed: Jun. 19, 2023

(65) Prior Publication Data

US 2024/0421645 A1 Dec. 19, 2024

(51) Int. Cl.
*H02K 3/02* (2006.01)
*H02K 1/16* (2006.01)
*H02K 3/30* (2006.01)

(52) U.S. Cl.
CPC ............. *H02K 3/02* (2013.01); *H02K 1/16* (2013.01); *H02K 3/30* (2013.01)

(58) Field of Classification Search
CPC ...................................................... H02K 3/02
USPC .................................................. 310/179–215
See application file for complete search history.

(56) References Cited

U.S. PATENT DOCUMENTS

2022/0199280 A1* 6/2022 Lekarski ................. H01B 1/04

FOREIGN PATENT DOCUMENTS

CN 112769270 A * 5/2021 ........... H02K 15/021
CN 114345664 A * 4/2022

OTHER PUBLICATIONS

Machine translation of CN-112769270-A (Year: 2020).*
Machine translation of CN-114345664-A (Year: 2022).*
Cao, Mu; Ultrahigh Electrical Conductivity of Graphene Embedded in Metals; Advanced Functional Materials, www.afm-journal.de; 2019; 8 pages; 29, 1806792; Wiley-VCH Verlag Gmbh & Co. KGaA, Weinheim.
Pan, Chaochao; Enhanced electrical conductivity in graphene—copper multilayer composite; AIP Advances 12; Oct. 14, 2021; 7 pages; 015310 (2022); AIP Publishing, published online: Jan. 6, 2022; https://doi.org/10.1063/5.0073879.

* cited by examiner

*Primary Examiner* — Oluseye Iwarere
*Assistant Examiner* — Minki Chang
(74) *Attorney, Agent, or Firm* — Vivacqua Crane, PLLC (57) ABSTRACT

A conductive composite stator unit for an electric motor of a vehicle is provided. The stator unit comprises a stator core comprising a body having a first core end and an opposing second core end. The stator unit further comprises a plurality of conductive bars extending from the first core end to the second core end. Each conductive bar comprises a straight portion disposed in one of the slots such that the respective conductive bar is in contact with the stator core. Each conductive bar comprising a central portion and an outer layer disposed thereabout for electrical current to flow therethrough relative to the longitudinal axis, the outer layer comprises at least two copper-graphene (Cu-Gr) layers. Each Cu-Gr layer comprises a copper layer and a graphene layer. The stator unit further comprises an insulator layer disposed about each of the plurality of conductive bars.

20 Claims, 5 Drawing Sheets

CONDUCTIVE COMPOSITE STATOR UNIT FOR AN ELECTRIC MOTOR OF A VEHICLE

INTRODUCTION

The present disclosure relates to stator units for vehicles and, more particularly, conductive composite stator units for electric motors of vehicles wherein the stator units have conductive bars/wires coated with copper-graphene multilayer composites.

With increasing demand of fuel efficiency and particularly reduction of greenhouse gas emissions, today's automotive industry has begun a new era of manufacturing environmentally friendly zero-emission vehicles such as battery electric vehicles. Current challenges are met to increase electric power density and lower energy consumption.

SUMMARY

Thus, while current stator units for electric motors achieve their intended purpose, there is a need for a new and improved conductive composite stator unit for an electric motor of a vehicle to increase electric power density and lower energy consumption.

In accordance with one aspect of the present disclosure, a conductive composite stator unit for an electric motor of a vehicle is provided. The stator unit comprises a stator core. The stator core comprises a body having a first core end and an opposing second core end defining a longitudinal axis. The body further has an inner radial surface extending from the first core end to the second core end relative to the longitudinal axis. The inner radial surface has a plurality of inner walls inwardly extending from the first core end to the second core end to define open slots formed between respective inner walls from the first core end through the second core end.

In this aspect, the stator unit further comprises a plurality of conductive bars extending from the first core end to the second core end. Each conductive bar comprises a central portion and an outer layer disposed thereabout for electrical current to flow therethrough relative to the longitudinal axis. Each conductive bar comprises a straight portion disposed in one of the slots such that the respective conductive bar is in contact with the stator core. Each straight portion has a first radial end at the first core end and a second radial end at the second core end. The first radial end extends from the stator core to a first turn portion and the second radial end extends from the stator core to a second turn portion. The outer layer comprises at least two copper-graphene (Cu-Gr) layers. Each Cu-Gr layer comprises a copper layer and a graphene layer. Furthermore, the stator unit further comprises an insulator layer disposed about each of the plurality of conductive bars.

In an embodiment, the outer layer further comprises a metal substrate having a first side and an opposite second side. The at least two Cu-Gr layer is a first Cu-Gr multilayer composite disposed on the first side of the metal substrate. The outer layer further comprises a second Cu-Gr multilayer composite disposed on the second side of the metal substrate.

In one embodiment, the metal substrate has a thickness of between 5 microns and 25 microns. In another embodiment, the metal substrate comprises one of copper, aluminum, carbon steel and stainless steel. In yet another embodiment, the second Cu-Gr multilayer composite comprises at least two Cu-Gr layers and comprises copper and graphene. Moreover, each Cu-Gr layer of the first and second Cu-Gr multilayers has a thickness of between 0.1 micron and 0.5 micron.

In one embodiment, each of the first and second Cu-Gr multilayer composites has a thickness of between 0.2 micron to 200 micron. In another embodiment, each of the first and second Cu-Gr multilayer composites has a graphene volume fraction of 0.002% to 0.2%. In yet another embodiment, each Cu-Gr layer has a graphene volume fraction of 0.002% to 0.2%. In still another embodiment, the central portion comprises one of copper and aluminum.

In another aspect of the present disclosure, another conductive composite stator unit for an electric motor of a vehicle is provided. The stator unit comprises a stator core comprising a body having a first core end and an opposing second core end defining a longitudinal axis. The body has an inner radial surface extending from the first core end to the second core end relative to the longitudinal axis. The inner radial surface has a plurality of inner walls inwardly extending from the first core end to the second core end defining open slots formed between respective inner walls from the first core end through the second core end.

In this aspect, the stator unit comprises a plurality of conductive bars extending from the first core end to the second core end. Each conductive bar comprises a central portion and an outer layer disposed thereabout for electrical current to flow therethrough relative to the longitudinal axis. Each conductive bar comprises a straight portion disposed in one of the slots such that the respective conductive bar is in contact with the stator core. Each straight portion has a first radial end at the first core end and a second radial end at the second core end. The first radial end extends from the stator core to a first turn portion and the second radial end extends from the stator core to a second turn portion.

In this aspect, the outer layer comprises at least two copper-graphene (Cu-Gr) layers. Each Cu-Gr layer comprising a copper layer and a graphene layer. Each Cu-Gr layer has a graphene volume fraction of 0.002% to 0.2%. Moreover, the central portion comprises one of copper and aluminum. Furthermore, the stator unit further comprises an insulator layer disposed about each of the plurality of conductive bars.

In one embodiment, the outer layer further comprises a metal substrate having a first side and an opposite second side. The at least two Cu-Gr layers is a first Cu-Gr multilayer composite disposed on the first side of the metal substrate. The outer layer further comprises a second Cu-Gr multilayer composite disposed on the second side of the metal substrate.

In another embodiment, the metal substrate has a thickness of between 5 microns and 25 microns. In yet another embodiment, the metal substrate comprises one of copper, aluminum, carbon steel and stainless steel.

In an embodiment, the second Cu-Gr multilayer composite comprises at least two Cu-Gr layers and comprises copper and graphene. Moreover, each Cu-Gr layer of the first and second Cu-Gr multilayers has a thickness of between 0.1 micron and 0.5 micron. In another embodiment, each of the first and second Cu-Gr multilayer composites has a thickness of between 0.2 micron to 200 micron. In yet another embodiment, each of the first and second Cu-Gr multilayer composites has a graphene volume fraction of 0.002% to 0.2%.

In accordance with yet another aspect of the present disclosure, another conductive composite stator unit for an electric motor of a vehicle is provided. The stator unit comprises a stator core comprising a body having a first core end and an opposing second core end defining a longitudinal axis. The body has an inner radial surface extending from the first core end to the second core end relative to the longitudinal axis. The inner radial surface has a plurality of inner walls inwardly extending from the first core end to the second core end defining open slots formed between respective inner walls from the first core end through the second core end.

In this aspect, the stator unit further comprises a plurality of conductive bars extending from the first core end to the second core end. Each conductive bar comprises a central portion and an outer layer disposed thereabout for electrical current to flow therethrough relative to the longitudinal axis. The central portion comprises one of copper and aluminum. Each conductive bar comprises a straight portion disposed in one of the slots such that the respective conductive bar is in contact with the stator core. Each straight portion has a first radial end at the first core end and a second radial end at the second core end. The first radial end extends from the stator core to a first turn portion and the second radial end extends from the stator core to a second turn portion.

In this aspect, the outer layer comprises a metal substrate having a first side and an opposite second side. The outer layer comprises a first copper-graphene (Cu-Gr) multilayer composite disposed on the first side and a second Cu-Gr multilayer composite disposed on the second side of the first metal substrate. Furthermore, the stator unit further comprises an insulator layer disposed about each of the plurality of conductive bars.

In one embodiment, the metal substrate has a thickness of between 5 microns and 25 microns. Moreover, the metal substrate comprises one of copper, aluminum, carbon steel and stainless steel.

In another embodiment, each of the first and second Cu-Gr multilayer composites comprises at least two Cu-Gr layers and comprises copper and graphene. Moreover, each Cu-Gr layer has a thickness of between 0.1 micron and 0.5 micron. Furthermore, each Cu-Gr layer has a graphene volume fraction of 0.002% to 0.2%.

In still another embodiment, each of the first and second Cu-Gr multilayer composites has a thickness of between 0.2 micron to 200 micron. Moreover, each of the first and second Cu-Gr multilayer composites has a graphene volume fraction of 0.002% to 0.2%.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Embodiments of the present disclosure provide a conductive composite stator unit for an electric motor of a vehicle. The stator unit comprises a stator core and a plurality of conductive bars disposed within the stator core. Each conductive bar comprises a central portion (e.g., copper or aluminum) about which an outer layer is disposed for electric current to operatively flow therethrough. The outer layer comprises at least two copper-graphene (Cu-Gr) layers. Applications of the outer layer provide a conductivity advantage due to the "skin effect" of electron transport. That is, the skin effect is a phenomenon whereby alternating electric current does not flow uniformly with respect to the cross-section of a conductive element, such as the conductive bar. Current density of the conductive element or conductive bar is highest near the surface thereof and decreases exponentially as distance from the surface increases. Thus, when the Cu-Gr layers are coated or bonded about the conductive bar, an advantage of the relatively high conductivity of the Cu-Gr layers can be utilized due to the skin effect of electron transport in high frequency applications.

Figure 1:
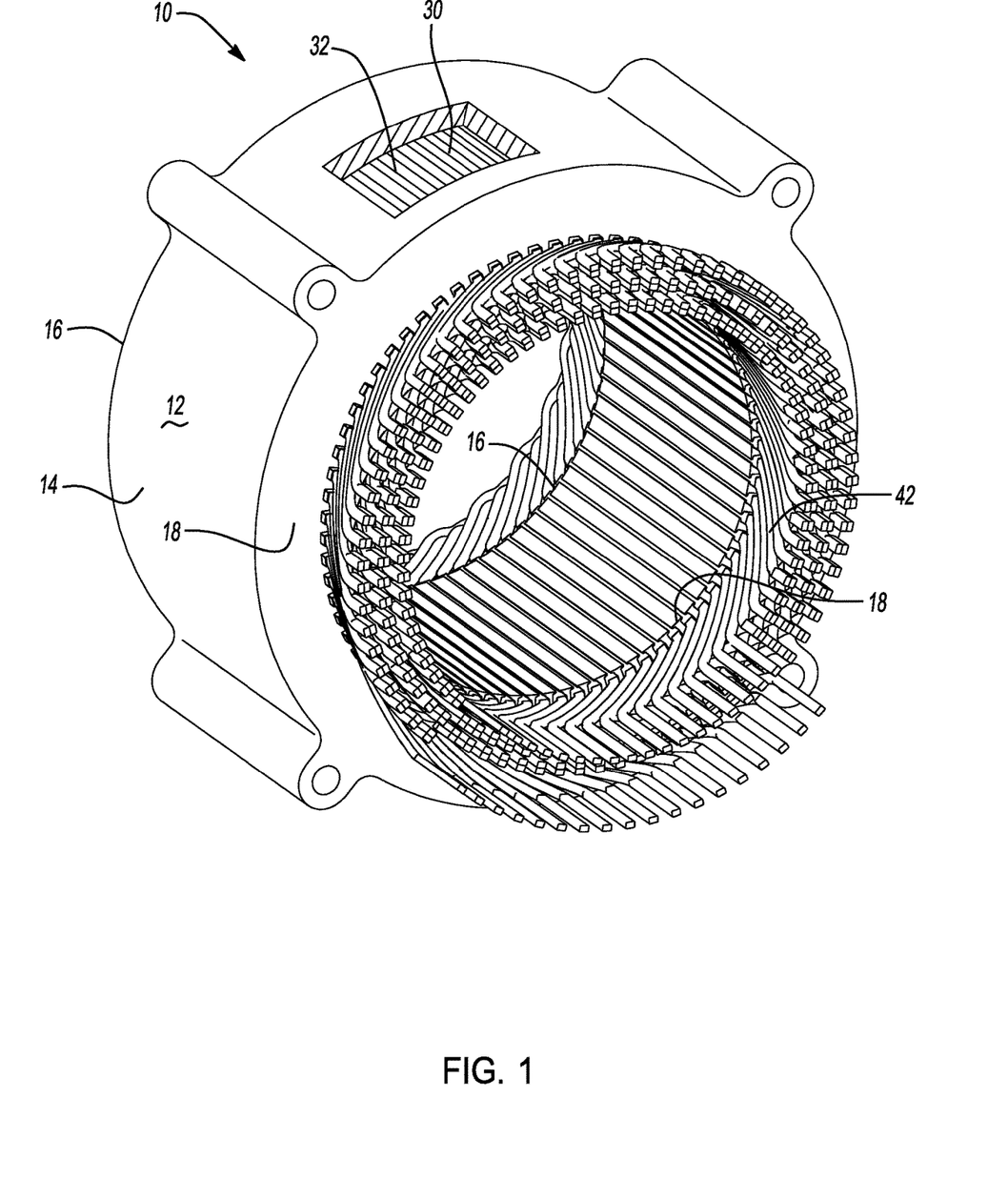
FIG. 1 is a perspective view of a conductive composite stator unit in accordance with one embodiment of the present disclosure.

FIG. 1 illustrates a conductive composite stator unit 10 for an electric motor of a vehicle in accordance with one embodiment of the present disclosure. As shown, the stator unit 10 comprises a stator core 12. In this embodiment, the stator core 12 comprises a body 14 having a first core end 16 and an opposing second core end 18 defining a longitudinal axis. Further, the body 14 has an inner radial surface 20 extending from the first core end 16 to the second core end 18 relative to the longitudinal axis. As depicted in FIG. 1, the inner radial surface 20 has a plurality of inner walls 22 inwardly extending from the first core end 16 to the second core end 18 to define open slots 24 formed between respective inner walls 22. That is, the open slots 24 extend between respective inner walls 22 from the first core end 16 through the second core end 18.

Figure 2:
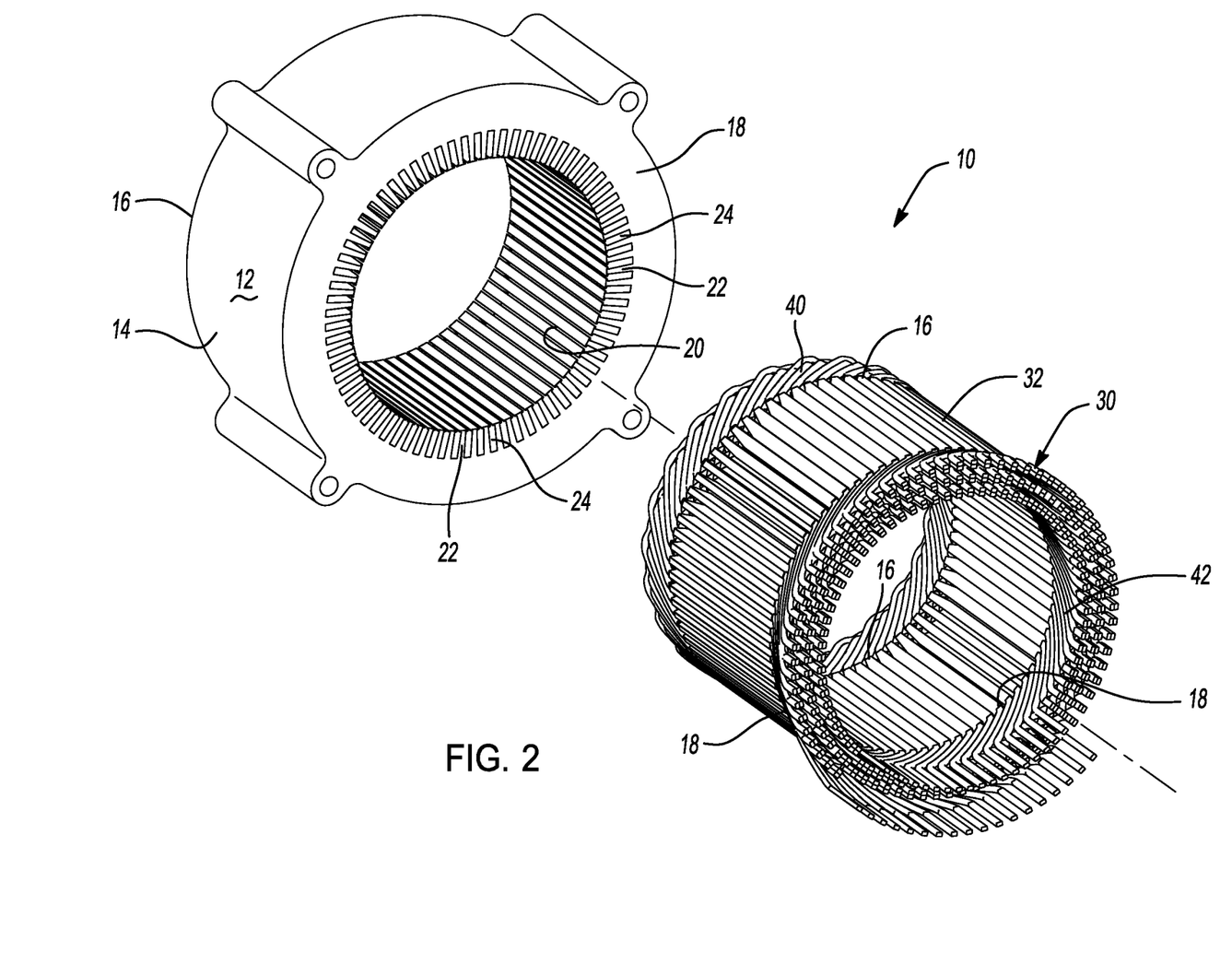
FIG. 2 is an exploded view of the stator unit in FIG. 1.

Referring to FIGS. 1-2, the stator unit 10 further comprises a plurality of winding conductive bars/wires 30 extending from the first core end 16 to the second core end 18 of the stator core 12. As described further below, each conductive bar 30 has a winding portion at each opposing end thereof. Moreover, the conductive bar 30 may have a cross-sectional shape that is flat, rectangular (FIG. 4), or round (FIG. 5), and may be used in motors, transformers, generators and electrical measuring instruments. Other suitable shapes of the conductive bar 30 may be used without departing from the spirit or scope of the present disclosure.

As shown in FIGS. 1-2, each conductive bar 30 comprises a straight portion 32 (shown in phantom in FIG. 1) disposed in one of the slots such that the respective conductive bar 30 is in contact with the stator core 12. In this embodiment, each straight portion 32 has a first radial end 34 at the first core end 16 and a second radial end 36 at the second core end 18. The first radial end 34 extends from the stator core 12 to a first turn portion 40 (winding portion) and the second radial end 36 extends from the stator core 12 to a second turn portion 42 (winding portion).

Figure 3:
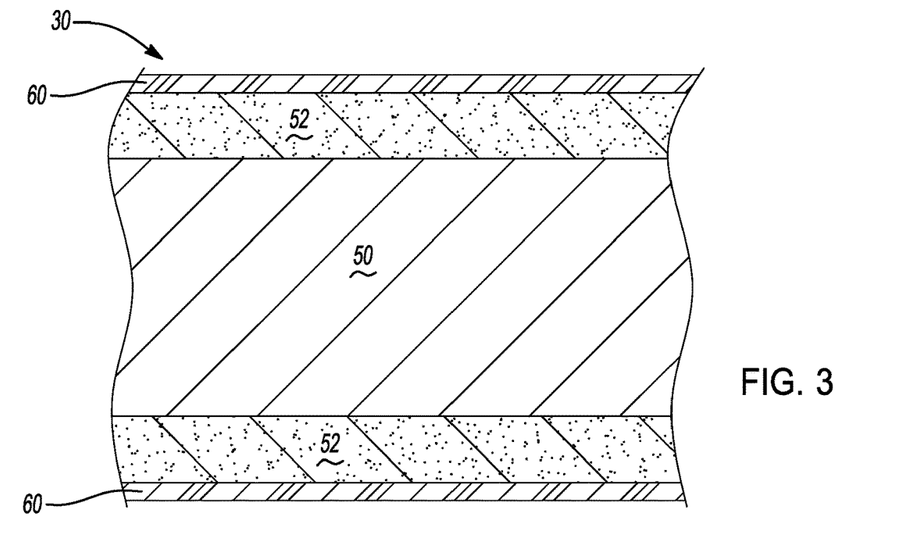
FIG. 3 is a side cross-sectional view of a conductive bar of the stator unit in FIG. 1.
Figures 4, 5:
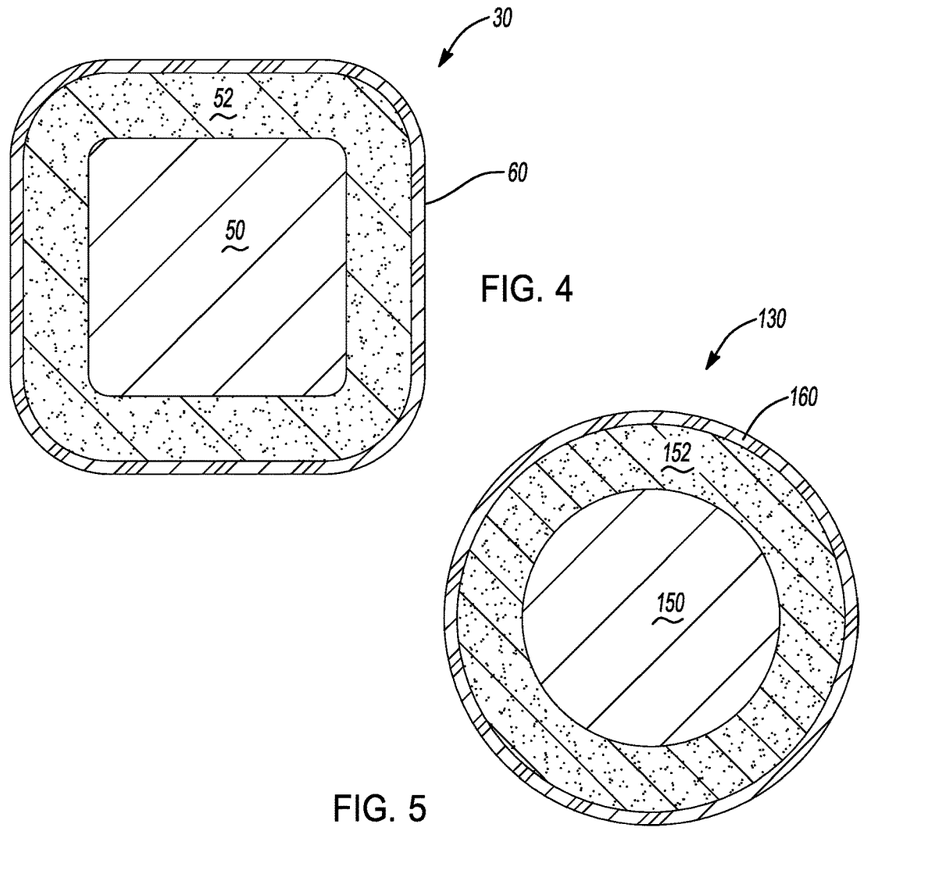
FIG. 4 is an end view of the conductive bar in FIG. 1.
FIG. 5 is an end view of a circular conductive bar of a stator unit in accordance with another embodiment of the present disclosure.

Referring to FIGS. 3-4, each conductive bar 30 comprises a central portion 50 and an outer layer 52 disposed thereabout for electrical current to flow therethrough relative to the longitudinal axis. The outer layer 52 comprises at least two copper-graphene (Cu-Gr) layers. Each Cu-Gr layer 54 comprises a copper layer 56 and a graphene layer 58. Furthermore, the central portion 50 comprises one of copper and aluminum.

As depicted in FIGS. 3-4, the stator unit 10 further comprises an insulator layer 60 disposed about each of the plurality of winding conductive bars 30. In one example, the insulator layer 60 is a wire enamel. The wire enamel may be applied on a copper or aluminum conductive bar/wire 30. The wire enamel may be cured and coated onto a conductive bar/wire 30 with heat or by any other suitable manner without departing from the spirit or scope of the present disclosure. The resulting main function of the coating is electrical insulation. The wire enamel may be applied to the conductive bar 30 in up to 30 layers. Such application thereof provides electrical insulation and helps the winding portions of the conductive bar 30 from short-circuiting. Further, the wire enamel is comprised of a material that allows for chemical and thermal resistance and that provides for adherence to a copper or aluminum conductive bar/wire 30 along with mechanical stability. That is, the wire enamel may be comprised of polyurethane (PUR), solderable polyesterimide (PEI), THEIC-modified polyester (TPE), THEIC-polyesterimide (TPEI), polyamide-imide (PAI), polyvinylformal (PVF), self-bonding (SB) materials (based on epoxy, polyvinyl-butyral, and polyamide) or any other suitable material without departing from the scope or spirit of the present disclosure.

FIG. 5 depicts a conductive wire 130 having a cross-sectional shape that is round. The conductive wire 130 is similar to the conductive bar 30 described above except for the cross-sectional shapes thereof. As shown, an outer layer 152 is disposed about a central portion 150 and an insulator layer 160 is coated about the outer layer 152.

Figure 6:
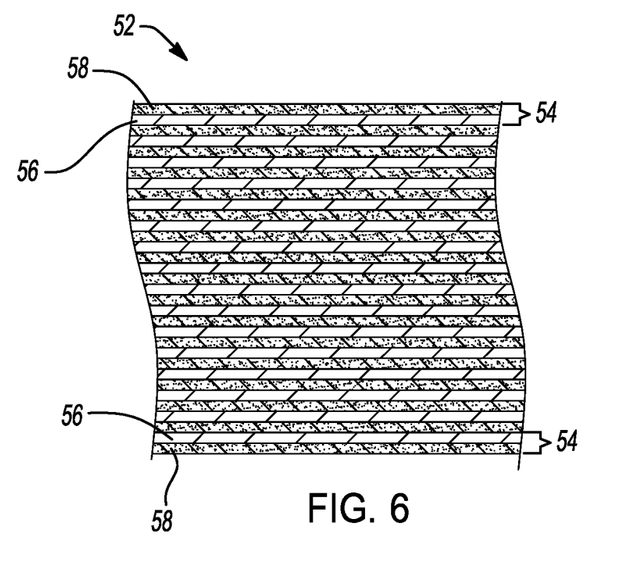
FIG. 6 is a cross-sectional side view of a copper-graphene multilayer composite of the conductive bar in FIG. 3 in accordance with one embodiment.

FIG. 6 illustrates a cross-section of the outer layer 52 of the conductive bar 30. As shown, the outer layer 52 may comprise at least two Cu-Gr layers 54 wherein each Cu-Gr layer 54 comprises copper and graphene. Preferably, each of the Cu-Gr layers 54 comprises a copper layer 56 and a graphene layer 58.

It is to be understood that the outer layer 52 of this embodiment may comprise a number of Cu-Gr layers 54 including 3, 4, 5, 6, 7, 8, 9, 10, 15, 20, 25, 30, 35, 40, 45, 50, 55, 60, 65, 70, 75, 80, 85, 90, 95, 100, 150, 200, 250, 300, 350, 400, 450, and greater than 500 Cu-Gr layers 54. Moreover, each Cu-Gr layer 54 has a thickness of 0.1 micron and 0.5 micron. Preferably, each Cu-Gr layer 54 may have a thickness of 0.2 micron, 0.3 micron, and 0.4 micron. In one embodiment, each Cu-Gr layer 54 has a graphene volume fraction of 0.002% to 0.2%. Preferably, each Cu-Gr layer 54 may have a graphene volume fraction of 0.003%, 0.004%, 0.005%, 0.006%, 0.007%, 0.008%, 0.009%, 0.010%, 0.011%, 0.012%, 0.014%, 0.016%, 0.018%, 0.02%, 0.05%, 0.075%, 0.1%, 0.125%, 0.15%, and 0.175%.

It is to be understood that each of the Cu-Gr layers 54 may be made by any suitable manner without departing from the spirit or scope of the present disclosure. For example, a graphene layer may be disposed on a first copper layer by modulating the graphene layer on the first copper layer using chemical vapor deposition (CVD) or physical vapor deposition (PVD). A second copper layer may be modulated on the graphene layer using electron beam deposition (EBD) on the graphene layer. On the second copper layer, alternating graphene layers and copper layers may then be modulated thereon by way of CVD and EBD, respectively. Other ways of making the first and second Cu-Gr multilayer composites may be implemented without departing from the spirit or scope of the present invention.

In this embodiment, the outer layer 52 has a thickness of 0.2 micron to greater than 200 microns. Preferably, the outer layer 52 may have a thickness of 0.3 micron, 0.4 micron, 0.5 micron, 1.0 micron, 1.5 micron, 2.0 microns, 2.5 microns, 3.0 microns, 3.5 microns, 4.0 microns, 4.5 microns, 5.0 microns, 5.5 microns, 6.0 microns, 6.5 microns, 7.0 microns, 7.5 microns, 8.0 microns, 8.5 microns, 9.0 microns, 9.5 microns, 10 microns, 25 microns, 50 microns, 75 microns, 100 microns, 125 microns, 150 microns, 175 microns, 225 microns, 250 microns, 300 microns, 400 microns, 500 microns, and 550 microns or more. Preferably, the outer layer 52 may have a graphene volume fraction of 0.002% to 3%. Furthermore, the outer layer 52 may have a graphene volume fraction of 0.003%, 0.004%, 0.005%, 0.006%, 0.007%, 0.008%, 0.009%, 0.010%, 0.011%, 0.012%, 0.014%, 0.016%, 0.018%, 0.02%, 0.05%, 0.075%, 0.1%, 0.125%, 0.15%, and 0.175%, 0.25%, 0.3%, 0.4%, 0.5%, 0.6%, 0.7%, 0.8%, 0.9%, 1%, 1.5%, 2%, 2.5% or higher.

Figure 7:
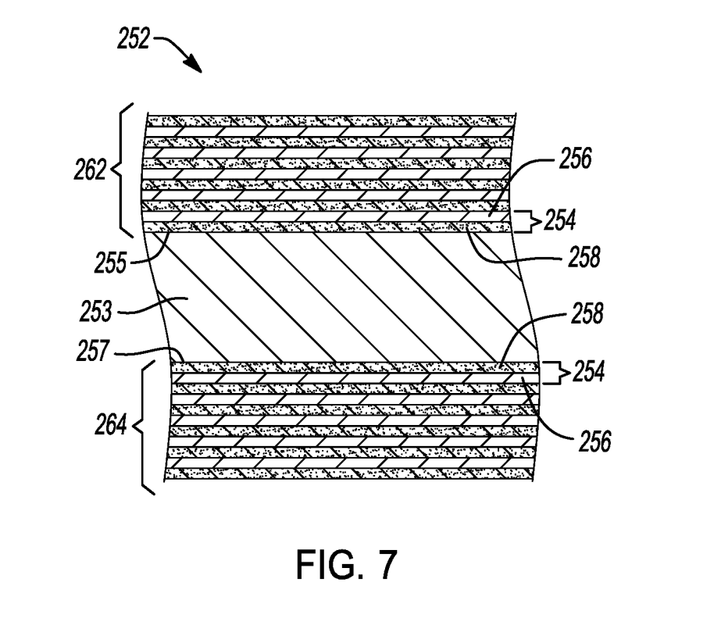
FIG. 7 is a cross-sectional side view of a copper-graphene multilayer composite of a conductive bar of a stator unit in accordance with another embodiment of the present disclosure.

FIG. 7 illustrates a cross-section of an outer layer 252 of a conductive bar (not shown, but similar to the conductive bar 30 described above) in accordance with another embodiment of the present disclosure. As shown, the outer layer 252 comprises a metal substrate 253 (e.g., a metallic foil such as copper foil) having a first side 255 and an opposite second side 257. In one embodiment, the metal substrate 253 has a thickness of between 5 microns and 25 microns. Preferably, the metal substrate 253 may have a thickness of 6 microns, 7 microns, 8 microns, 9 microns, 10 microns, 11 microns, 12 microns, 13 microns, 14 microns, 15 microns, 16 microns, 17 microns, 18 microns, 19 microns, 20 microns, 21 microns, 22 microns, 23 microns, and 24 microns. Furthermore the metal substrate 253 may comprise one of copper, aluminum, carbon steel, and stainless steel.

As shown in FIG. 7, the outer layer 252 further comprises a first copper-graphene (Cu-Gr) multilayer composite 262 disposed by any suitable manner on the first side 255 and a second Cu-Gr multilayer composite 264 disposed on the second side 257 of the metal substrate 253. Moreover, each of the first and second Cu-Gr multilayer composites 262, 264 comprises at least two Cu-Gr layers 254, preferably six or more Cu-Gr layers 254. Each of the Cu-Gr layers 254 comprises copper and graphene. Preferably, each of the Cu-Gr layers comprises a copper layer 256 and a graphene layer 258. It is to be understood that the first and second Cu-Gr multilayers 262, 264 may comprise a number of Cu-Gr layers 254 including 3, 4, 5, 6, 7, 8, 9, 10, 15, 20, 25, 30, 35, 40, 45, 50, 55, 60, 65, 70, 75, 80, 85, 90, 95, and 100 Cu-Gr layers or more.

Moreover, each Cu-Gr layer 254 of the first and second Cu-Gr multilayer composites 262, 264 comprises copper and graphene and has a thickness of between 0.1 micron and 0.5 micron. Preferably, each Cu-Gr layer 254 may have a thickness of 0.2 micron, 0.3 micron, and 0.4 micron. Additionally, each of the first and second Cu-Gr multilayer composites 262, 264 has a thickness of 0.2 micron to 200 micron, preferably 1.3 micron. Preferably, each of the first and second multilayer composites 262, 264 may have a thickness of 0.3 micron, 0.4 micron, 0.5 micron, 1.0 micron, 1.5 micron, 2.0 microns, 2.5 microns, 3.0 microns, 3.5 microns, 4.0 microns, 4.5 microns, 5.0 microns, 5.5 microns, 6.0 microns, 6.5 microns, 7.0 microns, 7.5 microns, 8.0 microns, 8.5 microns, 9.0 microns, 9.5 microns, 10 microns, 25 microns, 50 microns, 75 microns, 100 microns, 125 microns, 150 microns, and 175 microns.

Furthermore, each of the first and second Cu-Gr multilayer composites 262, 264 has a graphene volume fraction of 0.002% to 0.2%. Preferably, each of the first and second Cu-Gr multilayer composites 262, 264 may have a graphene volume fraction of 0.003%, 0.004%, 0.005%, 0.006%, 0.007%, 0.008%, 0.009%, 0.010%, 0.011%, 0.012%, 0.014%, 0.016%, 0.018%, 0.02%, 0.05%, 0.075%, 0.1%, 0.125%, 0.15%, and 0.175%.

It is to be understood that each of the first and second Cu-Gr multilayer composites 262, 264 may be made by any suitable manner without departing from the spirit or scope of the present disclosure. For example, the Cu-Gr layers 254 may be disposed on the metal substrate 253 by modulating a graphene layer 258 on the metal substrate 253 using chemical vapor deposition (CVD) or physical vapor deposition (PVD) and modulating a copper layer 256 using electron beam deposition (EBD) on the graphene layer. On the copper layer, alternating graphene layers 258 and copper layers 256 may then be modulated thereon by way of CVD and EBD, respectively. Other ways of making the first and second Cu-Gr multilayer composites 262, 264 may be implemented without departing from the spirit or scope of the present invention.

Figure 8:
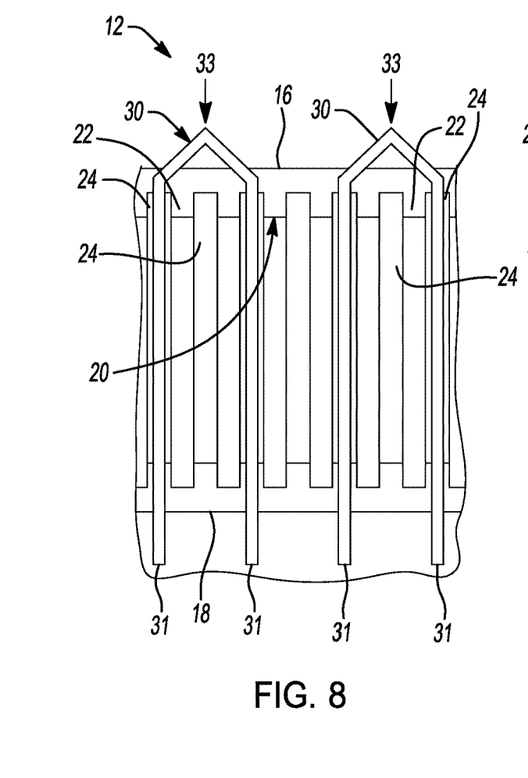
FIG. 8 is a partial view of an inner radial surface and conductive bars of the stator unit in FIG. 1 in assembly in accordance with one example of the present disclosure.

In assembly of the stator unit 10, FIG. 8 illustrates conductive bars 30, each of which has been shaped and disposed through open slots 24 between respective inner walls 22 on the inner radial surface 20 of the stator core 12 for assembling the stator unit 10. In this embodiment, each of the conductive bars 30 comprises free ends 31 disposed proximate to the second core end 18 of the stator core 12. As shown, such free ends 31 longitudinally extend in the open slots 24 through the first core end 16 and meet at a point 33. Shaping and disposing the conductive bars 30 in the open slots 24 may be accomplished by any suitable mechanical device, e.g., a robotic mechanism, without departing from the spirit or scope of the present disclosure.

Figure 9:
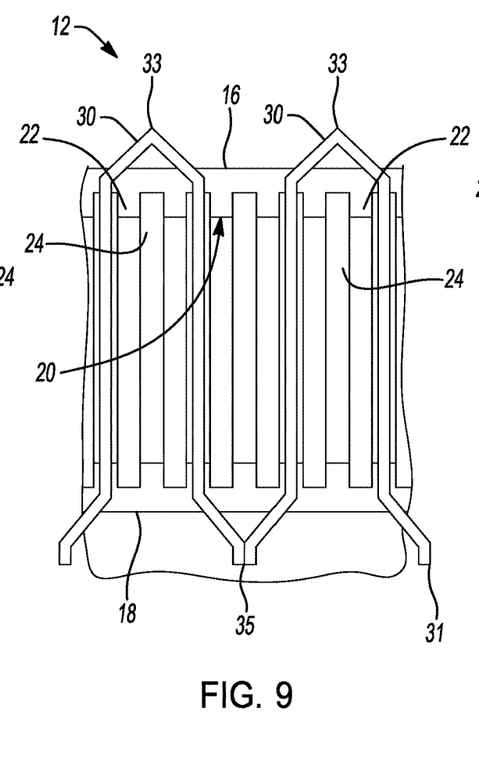
FIG. 9 is a partial view of the inner radial surface and the conductive bars in FIG. 8 in contact for welding of the conductive bars.

As shown in FIG. 9, free ends that are adjacent may be thermally twisted or connected defining connected ends 35 in preparation for welding. Contacting and connecting the free ends 31 that are adjacent may be accomplished by any suitable mechanical system, e.g., a grasping system with a robotic arm, without departing from the spirit or scope of the present disclosure.

Figure 10:
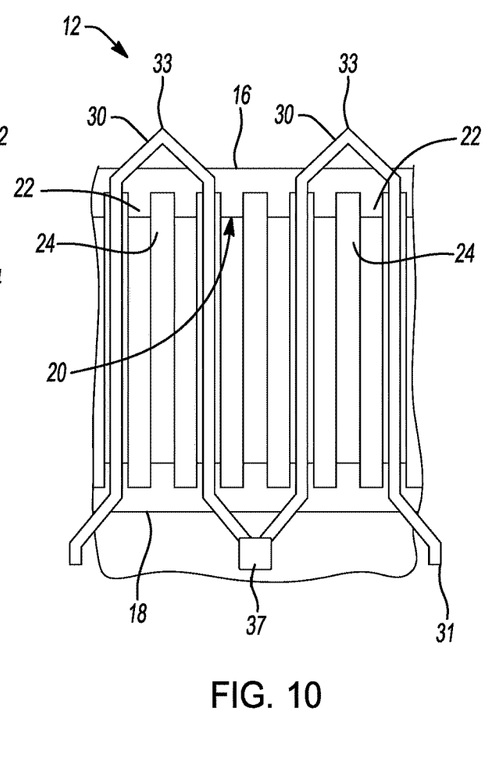
FIG. 10 is a partial view of the inner radial surface and the conductive bars in FIG. 8 at welding of the conductive bars.

Referring to FIG. 10, the connected ends 35 may be welded together defining welded ends 37 of the conductive bar 30. Welding the connected ends may be accomplished by any suitable welding mechanism without departing from the spirit or scope of the present disclosure.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A conductive composite stator unit for an electric motor of a vehicle, the stator unit comprising:
    a stator core comprising a body having a first core end and an opposing second core end defining a longitudinal axis, the body having an inner radial surface extending from the first core end to the second core end relative to the longitudinal axis, the inner radial surface having a plurality of inner walls inwardly extending from the first core end to the second core end defining open slots formed between respective inner walls from the first core end through the second core end;
    a plurality of conductive bars extending from the first core end to the second core end, each conductive bar comprising a central portion and an outer layer disposed thereabout for electrical current to flow therethrough relative to the longitudinal axis, each conductive bar comprising a straight portion disposed in one of the slots such that the respective conductive bar is in contact with the stator core, each straight portion having a first radial end at the first core end and a second radial end at the second core end, the first radial end extending from the stator core to a first turn portion and the second radial end extending from the stator core to a second turn portion, the outer layer comprising at least two copper-graphene (Cu-Gr) layers, each Cu-Gr layer comprising a copper layer and a graphene layer; and
    an insulator layer disposed about each of the plurality of conductive bars,
    wherein the outer layer further comprises a metal substrate having a first side and an opposite second side, the at least two Cu-Gr layers being a first Cu-Gr multilayer composite disposed on the first side of the metal substrate, the outer layer further comprising a second Cu-Gr multilayer composite disposed on the second side of the metal substrate.

2. The stator unit of claim 1 wherein the metal substrate has a thickness of between 5 microns and 25 microns.

3. The stator unit of claim 1 wherein the metal substrate comprises one of copper, aluminum, carbon steel and stainless steel.

4. The stator unit of claim 1 wherein the second Cu-Gr multilayer composite comprises at least two Cu-Gr layers and comprises of copper and graphene, and wherein each Cu-Gr layer of the first and second Cu-Gr multilayers has a thickness of between 0.1 micron and 0.5 micron.

5. The stator unit of claim 1 wherein each of the first and second Cu-Gr multilayer composites has a thickness of between 0.2 micron to 200 micron.

6. The stator unit of claim 1 wherein each of the first and second Cu-Gr multilayer composites has a graphene volume fraction of 0.002% to 0.2%.

7. The stator unit of claim 1 wherein each Cu-Gr layer has a graphene volume fraction of 0.002% to 0.2%.

8. The stator unit of claim 1 wherein the central portion comprises one of copper and aluminum.

9. The stator unit of claim 1, wherein each Cu-Gr layer has a thickness of 0.2 microns.

10. A conductive composite stator unit for an electric motor of a vehicle, the stator unit comprising:
    a stator core comprising a body having a first core end and an opposing second core end defining a longitudinal axis, the body having an inner radial surface extending from the first core end to the second core end relative to the longitudinal axis, the inner radial surface having a plurality of inner walls inwardly extending from the first core end to the second core end defining open slots formed between respective inner walls from the first core end through the second core end;

a plurality of conductive bars extending from the first core end to the second core end, each conductive bar comprising a central portion and an outer layer disposed thereabout for electrical current to flow therethrough relative to the longitudinal axis, each conductive bar comprising a straight portion disposed in one of the slots such that the respective conductive bar is in contact with the stator core, each straight portion having a first radial end at the first core end and a second radial end at the second core end, the first radial end extending from the stator core to a first turn portion and the second radial end extending from the stator core to a second turn portion, the outer layer comprising at least two copper-graphene (Cu-Gr) layers, each Cu-Gr layer comprising a copper layer and a graphene layer, each Cu-Gr layer having a graphene volume fraction of 0.002% to 0.2%, the central portion comprising one of copper and aluminum; and an insulator layer disposed about each of the plurality of conductive bars, wherein the outer layer further comprises a metal substrate having a first side and an opposite second side, the at least two Cu-Gr layers being a first Cu-Gr multilayer composite disposed on the first side of the metal substrate, the outer layer further comprising a second Cu-Gr multilayer composite disposed on the second side of the metal substrate.

11. The stator unit of claim 10 wherein the metal substrate has a thickness of between 5 microns and 25 microns.

12. The stator unit of claim 10 wherein the metal substrate comprises one of copper, aluminum, carbon steel and stainless steel.

13. The stator unit of claim 10 wherein the second Cu-Gr multilayer composite comprises at least two Cu-Gr layers and comprises copper and graphene, and wherein each Cu-Gr layer of the first and second Cu-Gr multilayers has a thickness of between 0.1 micron and 0.5 micron.

14. The stator unit of claim 10 wherein each of the first and second Cu-Gr multilayer composites has a thickness of between 0.2 micron to 200 micron.

15. The stator unit of claim 10 wherein each of the first and second Cu-Gr multilayer composites has a graphene volume fraction of 0.002% to 0.2%.

16. The stator unit of claim 10, wherein each Cu-Gr layer has a thickness of 0.2 microns.

17. A conductive composite stator unit for an electric motor of a vehicle, the stator unit comprising:

a stator core comprising a body having a first core end and an opposing second core end defining a longitudinal axis, the body having an inner radial surface extending from the first core end to the second core end relative to the longitudinal axis, the inner radial surface having a plurality of inner walls inwardly extending from the first core end to the second core end defining open slots formed between respective inner walls from the first core end through the second core end;

a plurality of conductive bars extending from the first core end to the second core end, each conductive bar comprising a central portion and an outer layer disposed thereabout for electrical current to flow therethrough relative to the longitudinal axis, the central portion comprising one of copper and aluminum, each conductive bar comprising a straight portion disposed in one of the slots such that the respective conductive bar is in contact with the stator core, each straight portion having a first radial end at the first core end and a second radial end at the second core end, the first radial end extending from the stator core to a first turn portion and the second radial end extending from the stator core to a second turn portion, the outer layer comprising a metal substrate having a first side and an opposite second side, the outer layer comprising a first copper-graphene (Cu-Gr) multilayer composite disposed on the first side and a second Cu-Gr multilayer composite disposed on the second side of the first metal substrate; and an insulator layer disposed about each of the plurality of conductive bars.

18. The stator unit of claim 17 wherein the metal substrate has a thickness of between 5 microns and 25 microns, and wherein the metal substrate comprises one of copper, aluminum, carbon steel and stainless steel.

19. The stator unit of claim 17 wherein each of the first and second Cu-Gr multilayer composites comprises at least two Cu-Gr layers and comprises copper and graphene, wherein each Cu-Gr layer has a thickness of between 0.1 micron and 0.5 micron, and wherein each Cu-Gr layer has a graphene volume fraction of 0.002% to 0.2%.

20. The stator unit of claim 17 wherein each of the first and second Cu-Gr multilayer composites has a thickness of between 0.2 micron to 200 micron, and wherein each of the first and second Cu-Gr multilayer composites has a graphene volume fraction of 0.002% to 0.2%.

* * * * *